US010362394B2

(12) United States Patent
Woodrow et al.

(10) Patent No.: US 10,362,394 B2
(45) Date of Patent: *Jul. 23, 2019

(54) PERSONALIZED AUDIO EXPERIENCE MANAGEMENT AND ARCHITECTURE FOR USE IN GROUP AUDIO COMMUNICATION

(71) Applicants: Arthur Woodrow, Rancho Santa Fe, CA (US); Tyson McDowell, San Diego, CA (US)

(72) Inventors: Arthur Woodrow, Rancho Santa Fe, CA (US); Tyson McDowell, San Diego, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/858,832

(22) Filed: Dec. 29, 2017

(65) Prior Publication Data

US 2018/0124511 A1 May 3, 2018

Related U.S. Application Data

(66) Continuation-in-part of application No. PCT/US2016/039067, filed on Jun. 23, 2016, (Continued)

(51) Int. Cl.
*H04B 1/00* (2006.01)
*H04R 29/00* (2006.01)
(Continued)

(52) U.S. Cl.
CPC .......... *H04R 3/005* (2013.01); *H04R 1/1083* (2013.01); *H04R 3/12* (2013.01); *H04R 27/00* (2013.01);
(Continued)

(58) Field of Classification Search
CPC ...... H04R 3/12; H04R 27/00; H04R 2420/03; H04R 3/00; H04R 3/005; H04R 29/00; H04R 29/007
(Continued)

(56) References Cited

U.S. PATENT DOCUMENTS

| | | | | |
|---|---|---|---|---|
| 4,021,613 A | 5/1977 | Kennedy | .......................... | 179/1 |
| 5,533,131 A | 7/1996 | Kury | ........................ | H04R 5/02 |

(Continued)

FOREIGN PATENT DOCUMENTS

| | | | |
|---|---|---|---|
| JP | 2007-147736 | 6/2007 | ............. G10L 21/02 |
| WO | WO2009117474 | 9/2009 | |
| WO | WO2013155777 | 10/2013 | ............ H04W 88/02 |
| WO | WO2014161299 | 10/2014 | |
| WO | WO2017210991 | 12/2017 | ............. G10L 15/02 |

OTHER PUBLICATIONS

U.S. Appl. No. 14/755,005, filed Jun. 30, 2015.
(Continued)

*Primary Examiner* — Xu Mei
(74) *Attorney, Agent, or Firm* — Hayes Soloway P.C.

(57) ABSTRACT

A closed audio circuit is disclosed for personalized audio experience management and audio clarity enhancement. The closed audio circuit includes a plurality of user equipment (UEs) and an audio signal combiner for a group audio communication session. The UEs and the audio signal combiner form a closed audio circuit allowing a user to target another user to create a private conversation to prevent eavesdropping. The UEs receive user audio input signals and send the audio input signals to the audio signal combiner. The audio signal combiner receives the audio input signals from each UE and transfer desired mixed audio output signals to each of the UE.

17 Claims, 10 Drawing Sheets

Related U.S. Application Data

Substitute for application No. 14/755,005, filed on Jun. 30, 2015, now Pat. No. 9,407,989.

(51) Int. Cl.
*H04R 3/00* (2006.01)
*H04R 27/00* (2006.01)
*H04R 3/12* (2006.01)
*H04R 1/10* (2006.01)

(52) U.S. Cl.
CPC ...... *H04R 2420/03* (2013.01); *H04R 2430/01* (2013.01)

(58) Field of Classification Search
USPC ...... 381/119, 77, 56, 71.1–71.14, 94.1–94.9, 381/73.1, 80–83
See application file for complete search history.

(56) References Cited

U.S. PATENT DOCUMENTS 5,736,927 A 4/1998 Stebbins
5,796,789 A 8/1998 Eftechiou ........ 379/35
6,064,743 A 5/2000 Suggs ........ 381/104
6,237,786 B1 5/2001 Ginter et al. ........ 213/153
6,775,264 B1 8/2004 Kurganov ........ 370/352
6,795,805 B1 9/2004 Bessette et al. ........ 704/223
7,137,126 B1 11/2006 Coffman et al. ........ 719/328
7,190,799 B2 3/2007 Bray ........ 381/119
7,287,009 B1 10/2007 Liebermann ........ 705/42
7,533,346 B2 5/2009 McGrath et al. ........ 715/757
7,577,563 B2 8/2009 El-Maleh et al. ........ 704/201
7,792,676 B2 9/2010 Klinefelter et al. ........ 704/271
7,805,310 B2 9/2010 Rohwer ........ 704/270.1
7,853,649 B2 12/2010 Lee et al. ........ 709/204
7,983,907 B2 7/2011 Visser et al. ........ G10L 21/02
8,051,369 B2 11/2011 Zirngibl et al. ........ 715/201
8,090,404 B2 1/2012 Xie ........ 455/556.1
8,103,508 B2 1/2012 Lord ........ 704/270.1
8,150,700 B2 4/2012 Shin et al. ........ 704/275
8,160,263 B2 4/2012 Apsey et al. ........ 381/71.1
8,190,438 B1 5/2012 Nelissen ........ 704/274
8,204,748 B2 6/2012 Proux et al. ........ 704/270
8,218,785 B2 7/2012 Von Wiegand ........ 381/77
8,233,353 B2 7/2012 Zhang et al. ........ 367/129
8,369,534 B2 2/2013 Johnson et al. ........ 381/77
8,489,151 B2 7/2013 Van Engelen et al. ........ 455/569.1
8,670,554 B2 3/2014 Mukund ........ 379/406.01
8,767,975 B2 7/2014 Short ........ 381/92
8,804,981 B2 8/2014 Sorensen et al. ........ 381/94.3
8,812,309 B2 8/2014 Ramakrishnan et al. ........ 704/226
8,838,184 B2 9/2014 Burnett et al. ........ H04M 3/568
8,888,548 B2 11/2014 Yi ........ B05B 17/063
8,898,054 B2 11/2014 Gammon ........ G10L 19/0018
8,958,587 B2 2/2015 Jensen ........ G01H 7/00
8,958,897 B2 2/2015 Cleve et al. ........ 700/94
8,976,988 B2 3/2015 Pedersen ........ H04R 25/505
8,981,994 B2 3/2015 Sorenson ........ G10K 11/34
9,031,838 B1 5/2015 Nash et al. ........ G10L 21/02
9,042,574 B2 5/2015 Sorensen ........ G10L 21/02
9,070,357 B1 6/2015 Kennedy et al. ........ G10L 15/00
9,082,411 B2 7/2015 Pedersen ........ G10L 21/0208
9,093,071 B2 7/2015 Crawley et al. ........ G10L 15/22
9,093,079 B2 7/2015 Kleffner et al. ........ G10L 21/0208
9,107,050 B1 8/2015 Fox ........ H04Q 4/12
9,183,845 B1 11/2015 Gopalakrishnan et al. ........ G10L 21/0208
9,191,738 B2 11/2015 Niwa et al. ........ H04R 3/00
9,224,393 B2 12/2015 Kjems et al. ........ G10L 21/0208
9,269,367 B2 2/2016 Stroemmer et al. ........ G10L 21/02
9,271,089 B2 2/2016 Suzuki et al. ........ H04R 25/30
9,275,653 B2 3/2016 Heubel et al. ........ G10L 21/06
9,329,833 B2 5/2016 Swierk et al. ........ G06F 3/167
9,330,678 B2 5/2016 Togawa et al. ........ G10L 21/04
9,351,091 B2 5/2016 Ivanov et al. ........ H04R 29/005
9,357,064 B1 5/2016 Walton ........ H04M 3/42391
9,361,903 B2 6/2016 Leorin et al. ........ G10L 21/0272
9,407,989 B1 * 8/2016 Woodrow ........ H04R 1/1083
9,495,975 B2 11/2016 Short et al. ........ G10L 25/18
9,497,542 B2 11/2016 Tanaka et al. ........ H04R 3/00
9,532,140 B2 12/2016 Kim et al. ........ H04R 3/005
9,564,148 B2 2/2017 Paczkowski et al. ........ G10L 21/06
9,569,431 B2 2/2017 Uszkoreit et al. ........ G06F 17/289
9,609,117 B2 3/2017 Davis et al. ........ H04M 1/72569
9,661,130 B2 5/2017 Feast et al. ........ H04M 3/22
9,667,803 B2 5/2017 Lashkari et al. ........ H04M 9/082
9,668,077 B2 5/2017 Tico et al. ........ H04R 29/005
9,672,823 B2 6/2017 Penilla et al. ........ G10L 15/22
9,723,401 B2 8/2017 Chen et al. ........ H04R 3/00
9,743,213 B2 8/2017 Mohammad et al. ........ H04S 7/302
9,754,590 B1 9/2017 Fox ........ G10L 15/30
9,762,736 B2 9/2017 Kreiner et al. ........ H04M 3/568
9,812,145 B1 11/2017 Fox ........ G10L 21/100
9,818,425 B1 11/2017 Ayrapetian et al. ........ G01L 21/0224
9,830,930 B2 11/2017 Miller et al. ........ G10L 25/51
9,918,178 B2 3/2018 Norris et al. ........ H04S 7/304
9,930,183 B2 3/2018 Kadiwala et al. ........ H04M 9/082
9,936,290 B2 4/2018 Mohammad et al. ........ H04R 3/002
9,947,364 B2 4/2018 Kanevsky et al. ........ G11B 20/10527
9,959,888 B2 5/2018 Gummadi et al. ........ G10L 25/90
9,963,145 B2 5/2018 Penilla et al. ........ H02J 7/14
2003/0185359 A1 10/2003 Moore et al. ........ H04M 15/00
2006/0271356 A1 11/2006 Vos ........ 704/222
2007/0083365 A1 4/2007 Shmunk ........ 704/232
2010/0023325 A1 1/2010 Bessette et al. ........ 704/219
2011/0246193 A1 10/2011 Shin ........ 704/233
2011/0289410 A1 11/2011 Paczkowski et al. ........ 715/716
2012/0114130 A1 5/2012 Lovitt ........ 381/73.1
2013/0343555 A1 12/2013 Yehuday et al. ........ G10K 11/175
2015/0078564 A1 3/2015 Guo et al. ........ G10L 21/0208
2015/0080052 A1 3/2015 Jensen ........ 455/557
2015/0117674 A1 4/2015 Meachum et al.
2016/0180863 A1 6/2016 Ozcan et al. ........ G10L 21/034
2016/0189726 A1 6/2016 Raniwala et al. ........ G10L 21/0208
2016/0295539 A1 10/2016 Atti et al. ........ H04L 56/0045
2017/0148447 A1 5/2017 Atti et al. ........ G10L 19/005
2017/0186441 A1 6/2017 Wenus et al. ........ G10L 21/0205
2017/0193976 A1 7/2017 Mohammad et al. ........ G10K 11/178
2017/0236522 A1 8/2017 Atti et al. ........ G10L 19/008
2017/0270930 A1 9/2017 Ozmeral et al. ........ G10L 17/005
2017/0270935 A1 9/2017 Atti et al. ........ G10L 19/008
2017/0318374 A1 11/2017 Dolenc et al. ........ H04R 1/10
2017/0330578 A1 11/2017 Karimi-Cherkandi et al. ........ G10L 21/02
2018/0014107 A1 1/2018 Razouane et al. ........ H04R 1/1041
2018/0054683 A1 2/2018 Pedersen et al. ........ H04R 25/554
2018/0090138 A1 3/2018 Finn et al. ........ G10L 15/22
2018/0122368 A1 5/2018 Costello et al. ........ G10L 15/1815
2018/0137876 A1 5/2018 Sun et al. ........ G10L 21/0216

OTHER PUBLICATIONS

U.S. Appl. No. 14/755,005, filed Jun. 30, 2015, Woodrow et al.
International Preliminary Report on Patentability issued in related PCT International Patent Application Serial No. PCT/US2016/039067, dated Jan. 2, 2018 (6 pages).
Written Opinion of the International Searching Authority issued in related PCT International Patent Application Serial No. PCT/US2016/039067, dated Sep. 18, 2016 (5 pages).
International Search Report issued in related PCT International Patent Application Serial No. PCT/US2016/039067, dated Sep. 18, 2016(3 pages).

* cited by examiner

PERSONALIZED AUDIO EXPERIENCE MANAGEMENT AND ARCHITECTURE FOR USE IN GROUP AUDIO COMMUNICATION

CROSS REFERENCE TO RELATED APPLICATION

This application is a continuation-in-part of PCT International Patent Application Serial No. PCT/US16/39067 filed Jun. 23, 2016, which claims priority to U.S. patent application Ser. No. 14/755,005 filed Jun. 30, 2015, now U.S. Pat. No. 9,407,989 granted Aug. 2, 2016, the entire disclosures of which are incorporated herein by reference.

FIELD OF THE DISCLOSURE

The present disclosure is generally related to audio circuitry, and more specifically related to a closed audio circuit system and network-based group audio architecture for personalized audio experience management and clarity enhancement in group audio communication, and to a method for implementation of the same.

BACKGROUND OF THE DISCLOSURE

Closed audio circuits have been used for a variety of audio communication applications for a variety of purposes. For example, closed audio circuits are often used for multi-user communication or for audio signal enhancement such as with noise cancellation, as well as many other uses. The underlying need for audio processing can be due to a number of factors. For example, audio processing for enhancement can be needed when a user has a hearing impairment, such as if the user is partially deaf. Similarly, audio enhancement can be beneficial for improving audio quality in settings with high external audio disruption, such as when a user is located in a noisy environment like a loud restaurant or on the sidewalk of a busy street. Closed audio circuits can also be beneficial in facilitating audio communication between users who are located remote from one another. In all of these situations, each individual user may require different architecture and/or enhancements to ensure that the user has the best quality audio feed possible.

However, none of the conventional devices or systems available in the market are successful with situations when individuals in a group audio communication need to have different listening experiences for each speaker and other audio inputs. The need for a user to hear specific sound sources clearly, whether those sources are physically in their presence or remote, in balance with one another, and dominant over all other sound coming from their local environment and that of the sound sources (background noise) is not addressed in prior art, nor is the need for private conversations without risking the eavesdropping of others as well as require enhanced clarity to prevent misunderstanding, no matter whether the conversations are conducted indoors or outdoors.

Thus, a heretofore unaddressed need exists in the industry to address the aforementioned deficiencies and inadequacies.

SUMMARY OF THE DISCLOSURE

Embodiments of the disclosure relate to a closed audio circuit for personalized audio experience management and to enhance audio clarity for a multiple-user audio communication application, such as a group audio communication for group hearing aid system, a localized virtual conference room, a geographically dynamic virtual conference room, a party line communication, or another group audio communication setting.

Embodiments of the present disclosure provide a system and method for a closed audio system for personalized audio experience management and audio clarity enhancement in group audio communication. Briefly described, in architecture, one embodiment of the system, among others, can be implemented as follows. A plurality of user equipment (UEs) are provided with each UE receiving an audio input signal from each corresponding user. An audio signal combiner receives the audio input signals from the plurality of UEs and generates a desired mixed audio output signal for each UE of the plurality of UEs. The mixed audio output signal for each UE is generated based at least on a selection input from each corresponding user. After receiving the audio input signals from the plurality of UEs, the audio signal combiner performs an audio clarity check to verify whether the audio input signal from each UE meets a clarity threshold.

The present disclosure can also be viewed as providing a non-transitory computer-readable medium for storing computer-executable instructions that are executed by a processor to perform operations for closed audio system for personalized audio experience management and audio clarity enhancement in group audio communication. Briefly described, in architecture, one embodiment of the operations performed by the computer-readable medium, among others, can be implemented as follows. A plurality of audio input signals are received from a plurality of user equipment (UEs) in a group audio communication. A plurality of selection inputs are received from each UE of the plurality of UEs. A plurality of mixed audio output signals are generated. The plurality mixed audio output signals are sent to the plurality of UEs. Each mixed audio output signal related to a corresponding UE of the plurality of UEs is generated based at least on a selection input from the corresponding UE. An audio clarity check is performed to verify whether the plurality of audio input signals from the plurality of UEs meets a clarity threshold.

The present disclosure can also be viewed as providing methods of group audio communication for personalized audio experience management and audio clarity enhancement. In this regard, one embodiment of such a method, among others, can be broadly summarized by the following steps: receiving a plurality of audio input signals from a plurality of users via a plurality of user equipment (UEs) with each user corresponding to a UE; sending the plurality of audio input signals to an audio signal combiner; and generating by the audio signal combiner a desired mixed audio output signal for each UE of the plurality of UEs; wherein the mixed audio output signal for each UE is generated based at least on a selection input from each corresponding user; and performing, at the audio signal combiner, an audio clarity check to verify whether the audio input signal from each UE meets a clarity threshold after the audio signal combiner receives the audio input signals from the plurality of UEs.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Reference will be made to exemplary embodiments of the present disclosure that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

One skilled in the art will recognize that various implementations and embodiments may be practiced in line with the specification. All of these implementations and embodiments are intended to be included within the scope of the disclosure.

DETAILED DESCRIPTION

In the following description, for the purpose of explanation, specific details are set forth in order to provide an understanding of the present disclosure. The present disclosure may, however, be practiced without some or all of these details. The embodiments of the present disclosure described below may be incorporated into a number of different means, components, circuits, devices, and systems. Structures and devices shown in block diagram are illustrative of exemplary embodiments of the present disclosure. Connections between components within the figures are not intended to be limited to direct connections. Instead, connections between components may be modified, re-formatted via intermediary components. When the specification makes reference to "one embodiment" or to "an embodiment", it is intended to mean that a particular feature, structure, characteristic, or function described in connection with the embodiment being discussed is included in at least one contemplated embodiment of the present disclosure. Thus, the appearance of the phrase, "in one embodiment," in different places in the specification does not constitute a plurality of references to a single embodiment of the present disclosure.

Various embodiments of the disclosure are used for a closed audio circuit for personalized audio experience management and to enhance audio clarity for a multiple-user audio communication application. In one exemplary embodiment, the closed audio circuit includes a plurality of user equipment (UEs) and an audio signal combiner for a group audio communication session. The UEs and the audio signal combiner form a closed audio circuit allowing a user to enhance specific audio feeds to thereby enrich the audio quality over environmental noise. The UEs receive user audio signals and transfer the audio signals to the audio signal combiner with or without preliminary clarity enhancement. The audio signal combiner receives the audio signals from each UE and transfer desired mixtures of audio signals to each of the UE.

Figure 1:
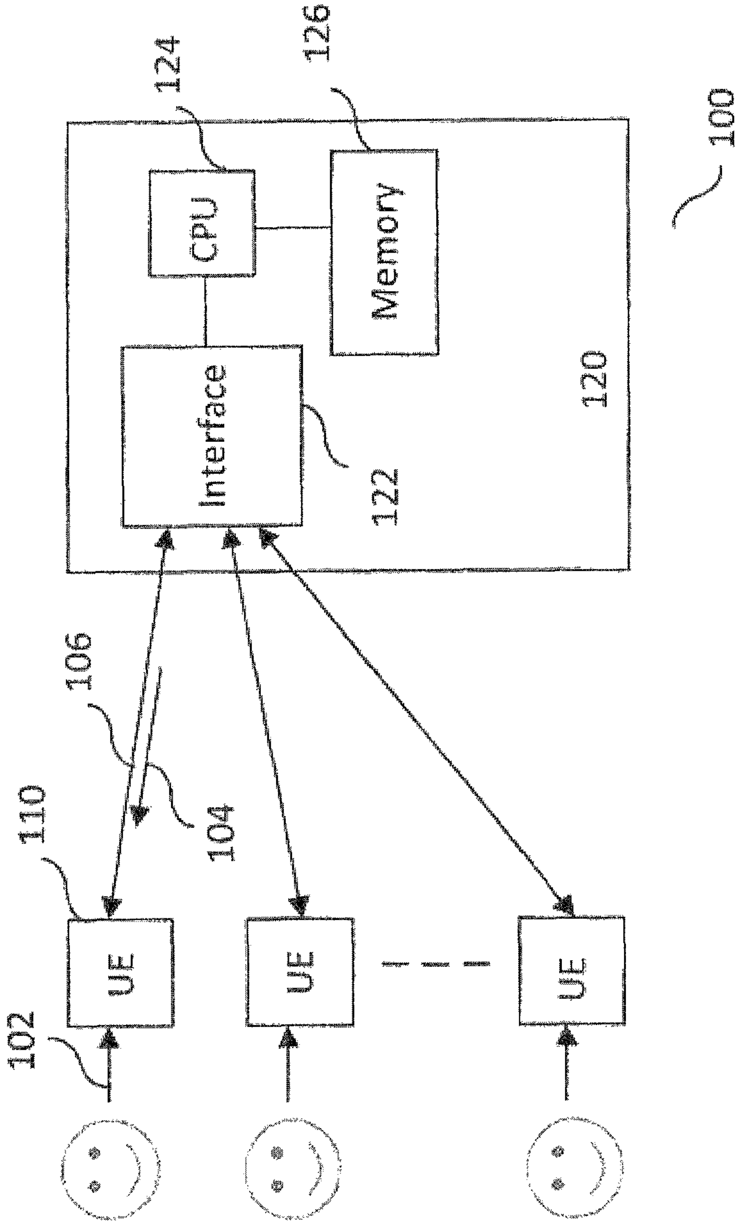
FIG. 1 is an exemplary block diagram of a closed audio circuit, in accordance with a first exemplary embodiment of the present disclosure.

FIG. 1 is an exemplary block diagram of a closed audio circuit 100, in accordance with a first exemplary embodiment of the present disclosure. The closed audio circuit 100 includes a plurality of user equipment (UEs) 110 and an audio signal combiner 120 for a group audio communication session. Each UE receives an audio input signal 102 from a corresponding user and sends the audio signal to the audio signal combiner 120. The audio signal combiner 120 receives the audio signals from each UE 110 and generates a mixed output audio signal 104 to each corresponding UE. The mixed output audio signal 104 to each corresponding UE may be the same or different for each of the plurality of UEs. In one example, the mixed output audio signal 104 is an audio mixture signal of audio signals from each of the UE of the plurality of the UEs. In other examples, the mixed output audio signal 104 to a corresponding UE 110 is a mixture of audio signals from desired UEs from the plurality of UEs based on a selection input from the corresponding user.

The UE 110 may be any type of communication device, including a phone, smartphone, a tablet, a walkie-talkie, a wired or wireless headphone set, such as an earbud or an in-ear headphone, or another other electronic device capable of producing an audio signal. The audio signal combiner 120 couples to a UE 110 via a coupling path 106. The coupling path 106 may be a wired audio communication link, a wireless link or a combination thereof The coupling path 106 for each corresponding UE may or may not be the same. Some UEs may couple to the audio signal combiner 120 via wired link(s), while some other UEs may couple to the audio signal combiner 120 via wireless communication link(s).

The audio signal combiner 120 includes a communication interface 122, a processor 124 and a memory 126 (which, in certain embodiments, may be integrated within the processor 124). The processor 124 may be a microprocessor, a central processing unit (CPU), a digital signal processing (DSP) circuit, a programmable logic controller (PLC), a microcontroller, or a combination thereof. In some embodiments, the audio signal combiner 120 may be a server in a local host setting or a web-based setting such as a cloud server. In certain embodiments, some or all of the functionalities described herein as being performed by the audio signal combiner 120 may be provided by the processor 124 executing instructions stored on a non-transitory computer-readable medium, such as the memory 126, as shown in FIG. 1. The communication interface 122 may be an MIMO (multiple-input and multiple-output) communication interface capable of receiving audio inputs from the plurality of UEs and transmitting multiple audio outputs to the plurality of UEs.

Figure 2:
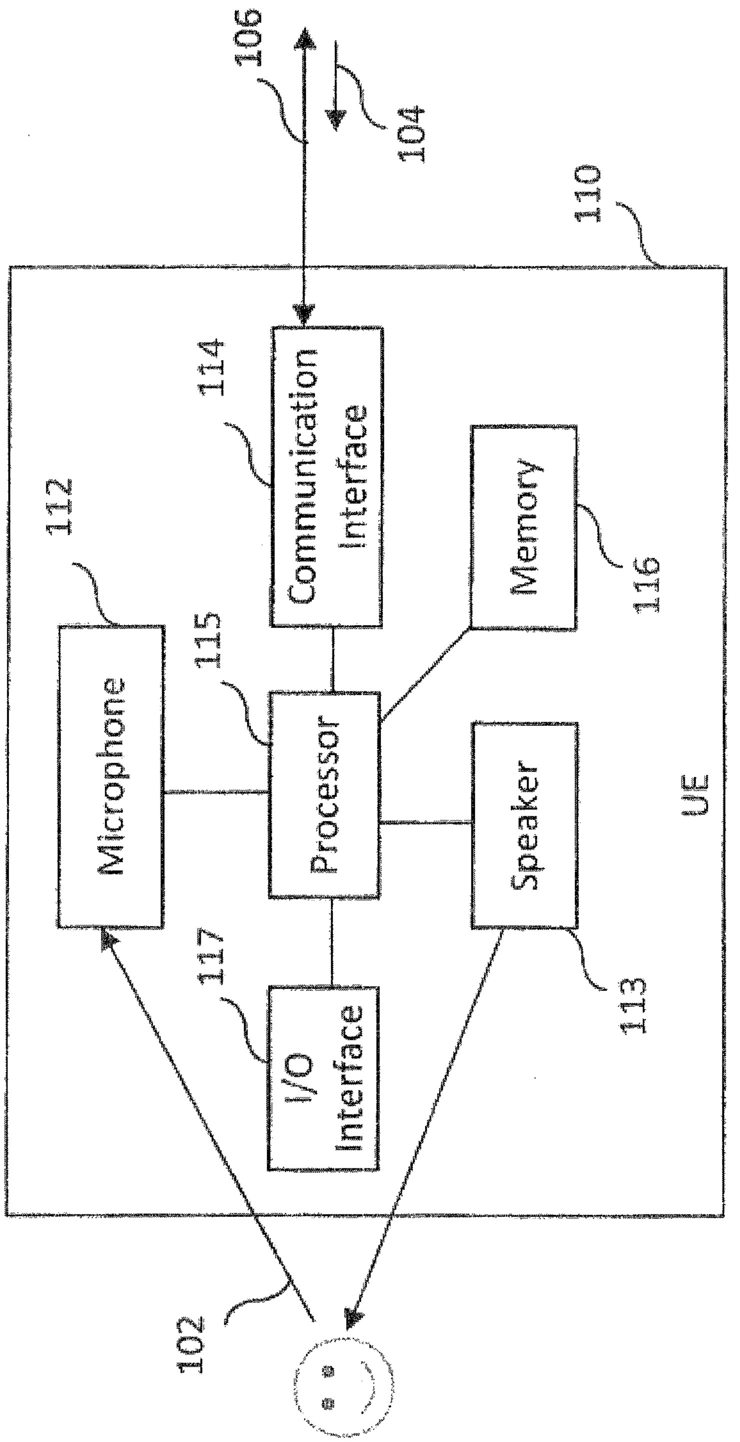
FIG. 2 is an exemplary block diagram of a user equipment (UE) circuit, in accordance with a second exemplary embodiment of the present disclosure.

FIG. 2 is an exemplary block diagram of a user equipment (UE) circuit, in accordance with a second exemplary embodiment of the present disclosure. As shown in FIG. 2, the UE 110 includes a microphone 112, a speaker 113, an UE communication interface 114, a processor 115, a memory 116 (which, in certain embodiments, may be integrated within the processor 115) and an input/output (I/O) interface 117. The input/output (I/O) interface 117 may include a keyboard, a touch screen, touch pad, or a combination thereof. In certain embodiments, the UE 110 may include additional components beyond those shown in FIG. 2 that may be responsible for enabling or performing the functions of the UE 110, such as communicating with another UE and for processing information for transmitting or from reception, including any of the functionality described herein. Such additional components are not shown in FIG. 2 but are intended to be within the scope of coverage of this application. In certain embodiments, the microphone 112 and the speaker 113 may be integrated within the UE 110, or as UE accessories coupled to the UE in a wired or wireless link.

After the UE 110 receives an audio input signal from a user, the processor 115 may implement a preliminary audio clarity enhancement for the audio input signal before the user input audio signal is sent to the audio signal combiner 120. The preliminary audio clarity enhancement may include passive or active noise cancellation, amplitude suppression for a certain audio frequency band, voice amplification/augmentation, or other enhancement. The preliminary clarity enhancement may be desirable especially when a user is in an environment with background noise that may cause the user difficulty in hearing the audio signal, such that a user may be forced to increase the volume of the audio signal or otherwise perform an action to better hear the audio signal. If the user is in a relative quiet environment such as an indoor office, the UE 110 may send the audio input signal to the audio signal combiner 120 via the UE communication interface 114 without preliminary clarity enhancement. A user may decide whether the preliminary clarity enhancement is necessary for his or her voice input via the input/output (I/O) interface 117. After the UE 110 receives a mixed audio output signal from the audio signal combiner 120 via the UE communication interface 114, the user may also adjust the volume of the mixed audio output signal while the mixed audio output signal is played via the speaker 113.

In certain embodiments, some or all of the functionalities described herein as being performed by the UE may be provided by the processor 115 when the processor 115 executes instructions stored on a non-transitory computer-readable medium, such as the memory 116, as shown in FIG. 2. Additionally, as discussed relative to FIGS. 5-10, some or all of the functionalities described herein may be performed by any device within the architecture, including one or more UEs, one or more hosts or hubs, a cloud-based processor, or any combination thereof.

Referring back to FIG. 1, the audio signal combiner 120 receives the audio input signals from each UE 110 and generates a mixed output audio signal 104 to each corresponding UE. The mixed output audio signal 104 to each corresponding UE may or may not be the same. After receiving an audio input signal from each UE 110, the audio signal combiner 120 may perform an audio clarity check to verify whether the audio input signal from each UE 110 meets a clarity threshold. The clarity threshold may be related to at least one of signal-to-noise ratio (SNR), audio signal bandwidth, audio power, audio phase distortion, etc. If the audio input signal from a particular UE fails to meet the clarity threshold, the audio signal combiner 120 may isolate the audio input signal from the particular UE in real time and perform clarity enhancement for the audio input signal. The enhancement may include but not be limited to signal modulation or enhancement, noise depression, distortion repair, or other enhancements.

After performing clarity enhancement for those audio input signal(s) not meeting the clarity threshold, the audio signal combiner 120 may combine multiple audio input signals into a unified output audio signals for an enhanced, optimized, and/or customized output audio signal for corresponding UEs. The mixed output audio signal may include corresponding user's own audio input in raw or processed in the aforementioned ways to facilitate self-regulation of speech pattern, volume and tonality via local speaker-microphone feedback. The inclusion of the user's own audio source in the user's own mixed audio output signal permits speaker self-modulation of voice characteristics therefore allowing each user to "self-regulate" to lower volumes and improved speech clarity (and pace).

The result of this processing and enhancement of the audio signal may provide numerous benefits to users. For one, users may be better able to hear the audio signal accurately, especially when they're located in an environment with substantially background noise which commonly hinders the user's ability to hear the audio signal accurately. Additionally, the audio signal for users can be tailored to each specific user, such that a user with a hearing impairment can receive a boosted or enhanced audio signal. Moreover, due to the enhanced audio signal, there is less of a need for the user to increase the volume of their audio feed to overcome environmental or background noise, which allows audio signal to remain more private than conventional devices allow. Accordingly, the subject disclosure may be used to further reduce the risk of eavesdropping on the audio signal from nearby, non-paired listeners or others located in the nearby environment.

In one alternative, the mixed output audio signal may exclude corresponding user's own audio input so that local speaker-microphone feedback will not occur. The option of including/excluding a user's own audio input may be selected according to the user's input through the I/O interface 117 of the UE 110. The user's selection input is sent to the audio signal combiner 120, which then generates a corresponding mixture audio output signal to the specific UE including or excluding the user's own audio input.

Additionally, the user may see the plurality of users (or UEs) participating in the audio communication session displayed via the I/O interface 117 and chooses a desired UE or UEs among the plurality of UEs, wherein only the audio input signals from the desired UE or UEs are included for the mixed audio output signal for the user. Equivalently, the user may choose to block certain users (or UEs) such that the user's corresponding mixture audio output signal exclude audio inputs from those certain users (or UEs).

In another embodiment, the closed audio circuit may also permit a user to target selected other users to create a "private conversation" or "sidebar conversation" where the audio signal of private conversation is only distributed among the desired users. Simultaneously, the user may still receive audio signals from other unselected users or mixed audio signals from the audio signal combiner. In one embodiment, any UE participating in the private conversation has a full list of participated UEs in the private conversation shown via the I/O interface 117 of each corresponding UE. In another embodiment, the list of participated UEs in the private conversation is not known to those UEs not in the private conversation.

Any user being invited for the private conversation may decide whether to join the private conversation. The decision can be made via the I/O interface 117 of the user's corresponding UE. The audio signal combiner 120 distributes audio input signals related to the private conversation to the user being invited only after the user being invited sends an acceptance notice to the audio signal combiner 120. In some embodiments, any user already in the private conversation may decide to quit the private conversation via the I/O interface 117 of the user's corresponding UE. After receiving a quit notice from a user in the private conversation, the audio signal combiner 120 stops sending audio input signals related to the private conversation to the user choosing to quit.

In yet another embodiment, to initiate a private conversation, a user may need to send a private conversation request to selected other UEs via the audio signal combiner 120. The private conversation request may be an audio request, a private pairing request, or combination thereof. After the selected other UEs accept the private conversation request, the private conversation starts. In some embodiments, a user in the private conversation may select to include/exclude the user's own audio input within the private audio output signal sending to the user. The user may make the selection through the I/O interface 117 of the UE 110 and the selection input is sent to the audio signal combiner 120, which then process the corresponding mixed private audio output signal to the user accordingly.

Figure 3:
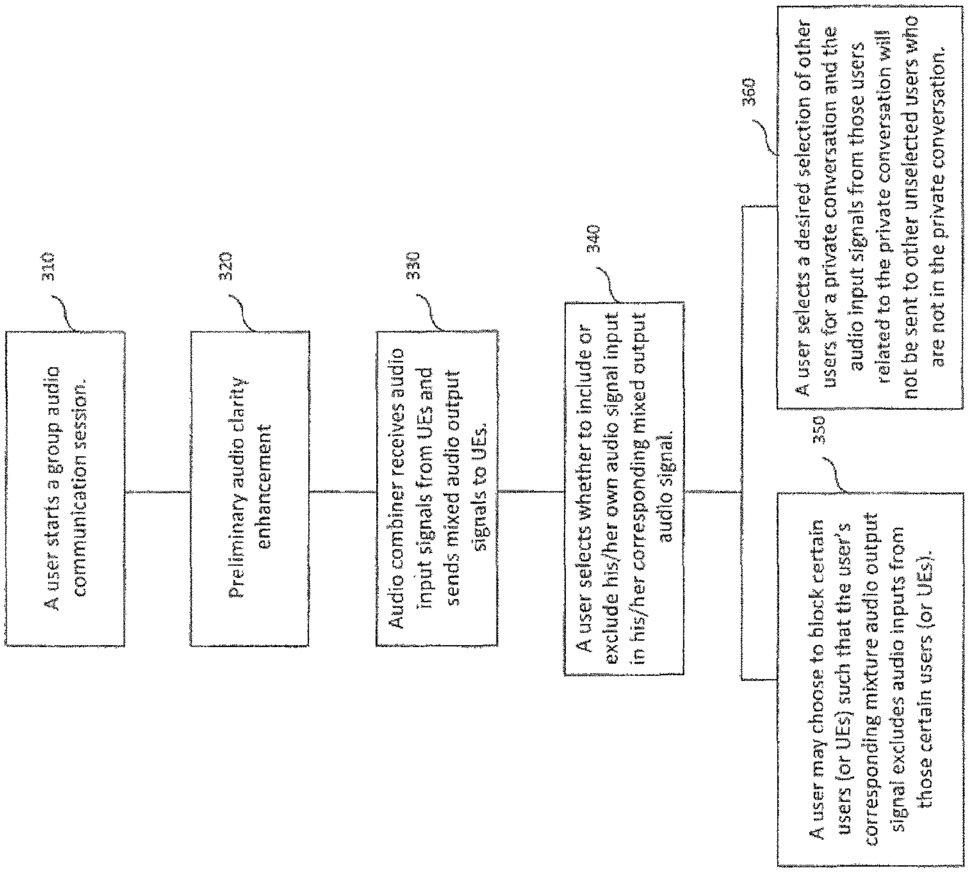
FIG. 3 is a flow, diagram of a group audio communication session, in accordance with a third exemplary embodiment of the present disclosure.

FIG. 3 is a flow diagram of a group audio communication session, in accordance with a third exemplary embodiment of the present disclosure. In step 310, a user sends an invitation to a plurality of other users and initiates a group audio communication session. In step 320, the user decides whether a preliminary audio clarity enhancement is necessary. If necessary, the UE performs the preliminary audio clarity enhancement for the user's audio input signal. Step 320 may be applicable to all the UEs participating in the group audio communication session. Alternatively, step 320 may be bypassed for UEs without the capacity of preliminary audio clarity enhancement.

In step 330, the audio signal combiner 120 receives the audio input signals from each UE 110 and generates a mixed output audio signal 104 to each corresponding UE. The mixed output audio signal 104 may or may not be the same for each corresponding UE. The audio signal combiner 120 also may perform an audio clarity check to verify whether the audio input signal from each UE meets a clarity threshold. If not, the audio signal combiner 120 may isolate the audio input signal from the particular UE in real time and perform clarity enhancement for the audio input signal before combining the audio input signal from the particular UE with any other audio input signals.

In step 340, a user selects whether to include or exclude his or her own audio signal input in his or her corresponding mixed output audio signal. In step 350, a user may choose to block certain users (or UEs) such that the user's corresponding mixture audio output signal excludes audio inputs from those certain users (or UEs). In step 360, a user may, in parallel, select a desired selection of other users for a private conversation and the audio input signals from those users related to the private conversation will not be sent to unselected other users who are not in the private conversation.

While FIG. 3 is shown with the exemplary flow diagram for a group audio communication session, it is understood that various modification may be applied for the flow diagram. The modification may include excluding certain steps and/or adding additional steps, parallel steps, different step sequence arrangements, etc. For example, a user may request the private conversation in the middle of the group audio communication session before step 340. A user may even initiate or join another private conversation in parallel in the middle of the started private conversation.

Figure 4:
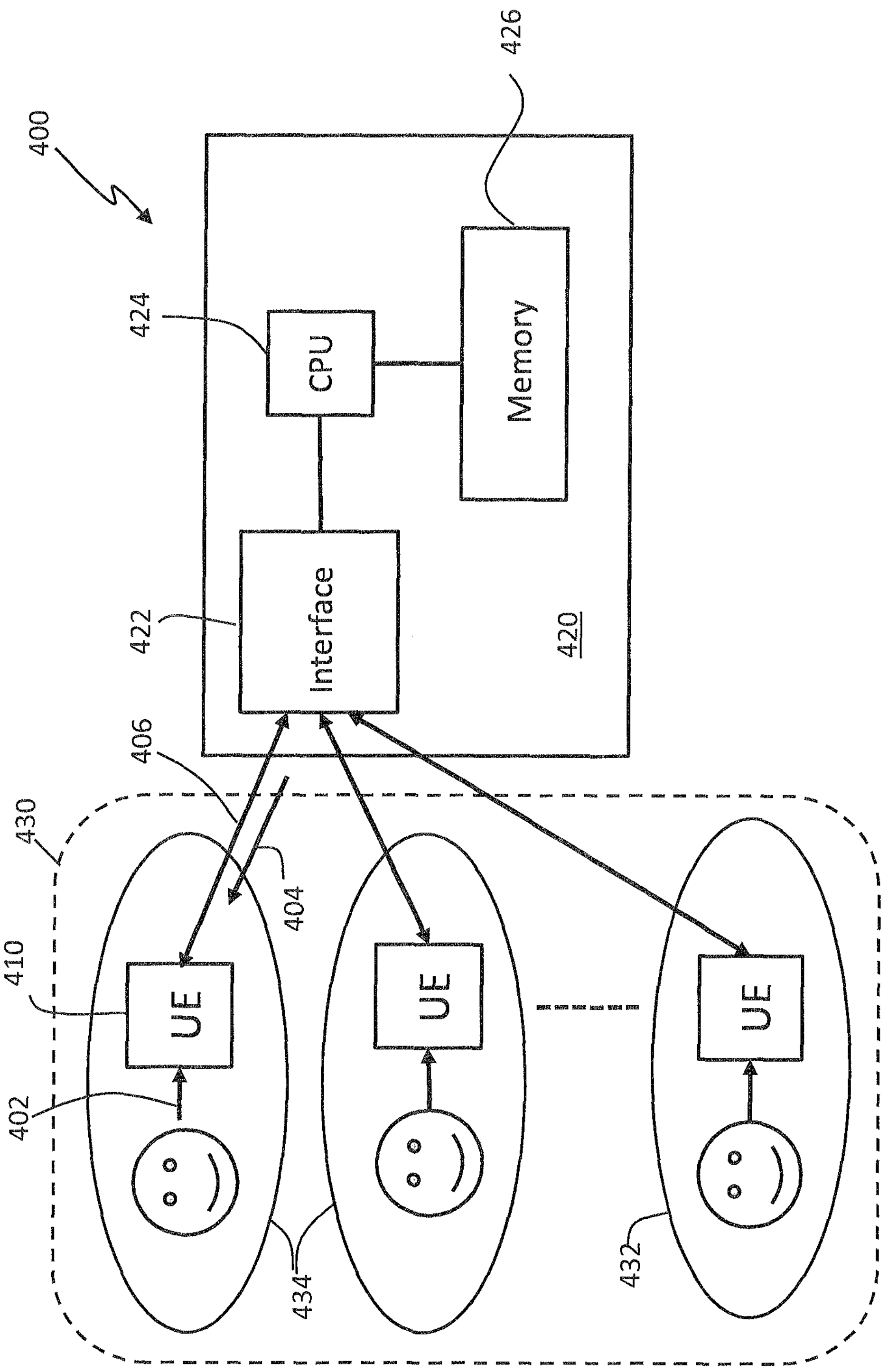
FIG. 4 is a block diagram of a closed audio circuit for group audio communication, in accordance with a fourth exemplary embodiment of the present disclosure.

FIG. 4 is a block diagram of a closed audio circuit 400, in accordance with a fourth exemplary embodiment of the present disclosure. The closed audio circuit 400 of FIG. 4 may be similar to that of FIG. 1, but further illustrates how the closed audio circuit can be used in a group audio communication setting. As shown, the closed audio circuit 400 includes a plurality of UEs 410 and an audio signal combiner 420 for a group audio communication session. The signal combiner 420 includes an interface 422, a CPU 424, and a memory 426, among other possible components, as described relative to FIG. 1. Each UE receives an audio input signal 402 from a corresponding user and sends the audio signal to the audio signal combiner 420. The audio signal combiner 420 receives the audio signals from each UE 410 couples to a UE 410 via a coupling path 406, and generates a mixed output audio signal 404 to each corresponding UE. The mixed output audio signal 404 to each corresponding UE may be the same or different for each of the plurality of UEs. In some embodiments, the mixed output audio signal 404 is an audio mixture signal of audio signals from each of the UE of the plurality of the UEs. In some embodiments, the mixed output audio signal 404 to a corresponding UE 410 is a mixture of audio signals from desired UEs from the plurality of UEs based on a selection input from the corresponding user.

The users and the plurality of UEs 410 may be part of a group audio communication setting 430, where at least a portion of the users and plurality of UEs 410 are used in conjunction with one another to facilitate group communication between two or more users. Within the group audio communication setting 430, at least one of the users and UEs 410 may be positioned in a geographically distinct location 432 from a location 434 of another user. The different locations may include different offices within a single building, different locations within a campus, town, city, or other jurisdiction, remote locations within different states or countries, or any other locations.

The group audio communication setting 430 may include a variety of different group communication situations where a plurality of users wish to communicate with enhanced audio quality with one another. For example, the group audio communication setting 430 may include a conference group with a plurality of users discussing a topic with one another, where the users are able to participate in the conference group from any location. In this example, the conference group may be capable of providing the users with a virtual conference room, where individuals or teams can communicate with one another from various public and private places, such as coffee houses, offices, co-work spaces, etc., all with the communication quality and inherent privacy that a traditional conference room or meeting room provides. The use of the closed audio circuit 400, as previously described, may allow for personalized audio experience management and audio enhancement, which can provide user-specific audio signals to eliminate or lessen the interference from background noise or other audio interference from one or more users, thereby allowing for successful communication within the group.

It is noted that the users may be located geographically remote from one another. For example, one user can be located in a noisy coffee shop, another user may be located in an office building, and another user may be located at a home setting without hindering the audio quality or privacy of the communication. In a similar example, the group communication setting may include a plurality of users in a single location, such as a conference room, and one or more users in a separate location. In this situation, to facilitate a group audio communication, the users may dial in or log-in to an audio group, whereby all members within the group can communicate. Participants in the conference room may be able to hear everyone on the line, while users located outside of the conference room may be able to hear all participants within the conference room without diminished quality.

Another group audio communication setting 430 may include a 'party line' where a plurality of users have always-on voice communication with one another for entertainment purposes. Another group audio communication setting 430 may include a group hearing aid system for people with diminished hearing abilities, such as the elderly. In this example, individuals who are hard of hearing and other people around them may be able to integrate and communicate with each other in noisy settings, such as restaurants. In this example, the users may be able to carry on a normal audio conversation even with the background noise which normally makes such a conversation difficult. In another example, the closed audio circuit 400 may be used with group audio communication settings 430 with productions, performances, lectures, etc. whereby audio of the performance captured by a microphone, e.g., speaking or singing by actors, lectures by speakers, etc. can be individually enhanced over background noise of the performance for certain individuals. In this example, an individual who is hard of hearing can use the closed audio circuit 400 to enhance certain portions of a performance. Yet another example may include educational settings where the speaking of a teacher or presenter can be individually enhanced for certain individuals. Other group audio communication settings 430 may include any other situation where users desire to communicate with one another using the closed audio circuit 400, all of which are considered within the scope of the present disclosure.

Figure 5:
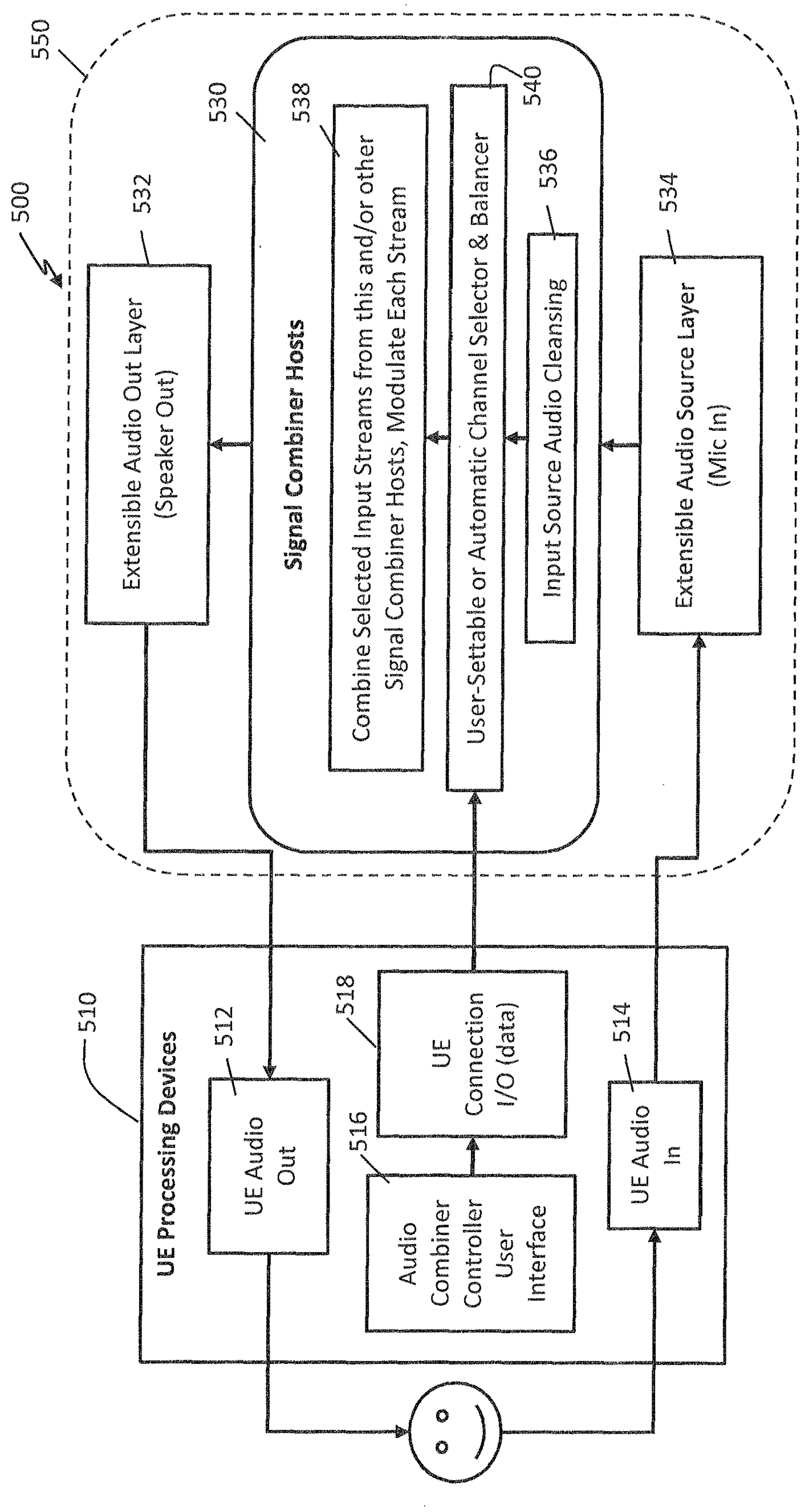
FIG. 5 is a block diagram of a closed audio system for personalized audio experience management, in accordance with a fifth exemplary embodiment of the present disclosure.

FIG. 5 is a block diagram of a closed audio system 500 for personalized audio experience management, in accordance with a fifth exemplary embodiment of the present disclosure. As shown, the system 500 may include similar architecture to the circuits of FIGS. 1-4, the disclosures of which are incorporated into FIG. 5, but the system 500 may include an architect that does not require a centralized processing unit. Rather, the system is organized for the signal combining for every single user is centrally processed, and the processing can occur at various locations within the architecture in between the users, e.g., within local hubs, within remote or cloud-based hubs, and in some cases within the UE device itself. The processing of the audio can be handled independently within one hub or shared between hubs. Thus, different users can utilize different central processors that are cross-linked to allow the system to function.

As shown, the UE processing device 510 in FIG. 5 is used by one or more users and is in communication with one or more signal combiner hosts 530. The UE processing device 510 has an UE audio out module 512 which receives an audio signal from an extensible audio out layer 532 of the signal combiner host 530, and a UE audio in module 514 transmits the audio signal from the UE 510 to the extensible audio source layer 534 of the signal combiner host 530. Each of the audio out and audio source layer 532, 534 may include any type or combination of audio input or output device, including web data streams, wired or wireless devices, headsets, phone lines, or other devices which are capable of facilitating either an audio output and/or an audio input. The signal combiner host 530 and the audio out and audio source layers 532, 534 may be included in a single hub 550.

The signal combiner host 530 receives the audio input signal and processes it with various tools and processes to enhance the quality of the audio signal. The processing may include an input audio source cleansing module 536 and a combining module 538 where the audio signal is combined together with the audio streams of other devices from other users, which may include other audio signals from other hosts. The combined audio input signal is then transmitted to the extensible audio out layer 532 where it is transmitted to the users.

The processing for enhancement of the audio signal may further include a user-settable channel selector and balancer 540, which the user can control from the UE 510. For example, the UE 510 may include an audio combiner controller user interface 516 which is adjustable by the user of that device, e.g., such as by using an app interface screen on a smart phone or another GUI interface for another device. The audio combiner controller user interface 516 is connected to the UE connection I/O module 518 which transmits data signals from the UE 510 to the signal combiner host 530. The data signal is received in the user-settable channel selector and balancer 540 where it modifies one or more of the input audio signals. For example, a hearing-impaired user having the UE processing device 510 can use the audio combiner controller interface 516 to send a signal to the user-settable channel selector and balancer 540 to partition out specific background noises in the audio signal, to modify a particular balance of the audio signal, or to otherwise enhance the audio signal to his or her liking. The user-settable channel selector and balancer 540 processes the audio signal, combines it with other signals in the combiner 538, and outputs the enhanced audio signal.

Figure 6:
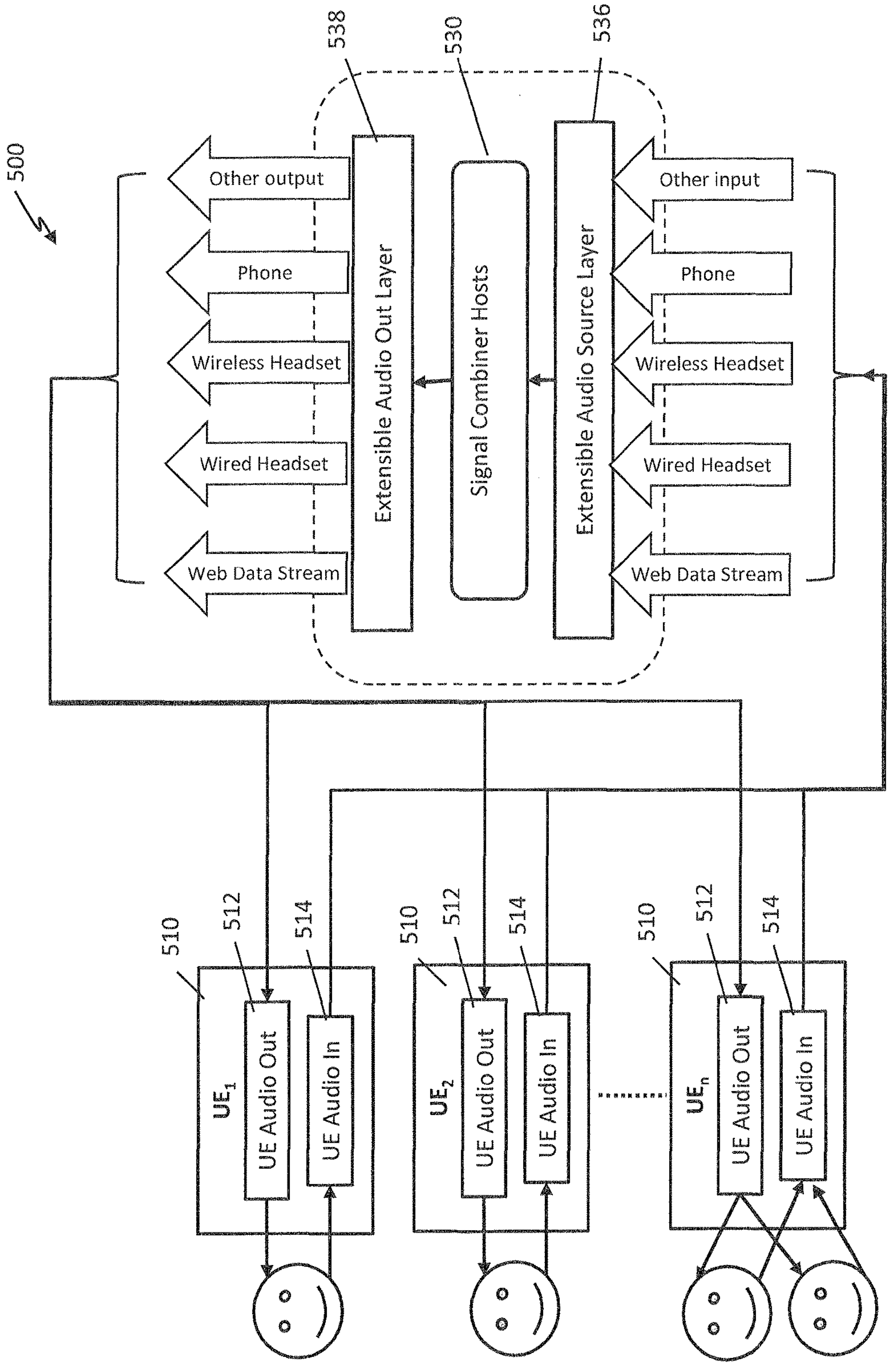
FIG. 6 is a block diagram of a closed audio system for personalized audio experience management, in accordance with the fifth exemplary embodiment of the present disclosure.

FIG. 6 is a block diagram of a closed audio system 500 for personalized audio experience management, in accordance with the fifth exemplary embodiment of the present disclosure. As shown in FIG. 6, a plurality of UEs 510, identified as $UE_1$, $UE_2$, to $UE_n$, where n represents any number, can be used with the signal combiner host 530. These UEs 510 each include the audio out module 512 and the audio in module 514. Any number of users may be capable of using the UE 510, e.g., some UEs 510 may be multi-user, such as a conference phone system, whereas other UEs 510 may be single-user, such as a personal cellular phone. Each user can engage with the signal combiner host 530 in a plurality of ways, including through web data streams, wired headsets, wireless headsets, phones, or other wired or wireless audio devices used in any combination. For example, the users may utilize a Bluetooth ear and a microphone via a phone, or with a phone wirelessly bound to a hub 550, importing channels from the web, a conference line, and other people present to them. A user could have just the earbuds connected to the audio out layer 532 with a microphone wired to a device within the hub 550.

It is noted that each sound source used, regardless of the type, is cleaned to isolate the primary speaker of that source with the various pre-processing techniques discussed relative to FIGS. 1-5. It is advantageous to isolate the primary speaker of the source through pre-processing for each signal or stream within a device that is as local to that stream as possible. For example, pre-processing on the phone of the primary speaker or at the local hub is desired over pre-processing in a more remotely positioned device. Using the interface on the UE 510, discussed relative to FIG. 5, each user can control their individual combined listening experience via a phone or web app which informs whatever processor is doing the final combining, whether that is in the cloud, on the hub, on a host phone, or elsewhere.

Figure 7:
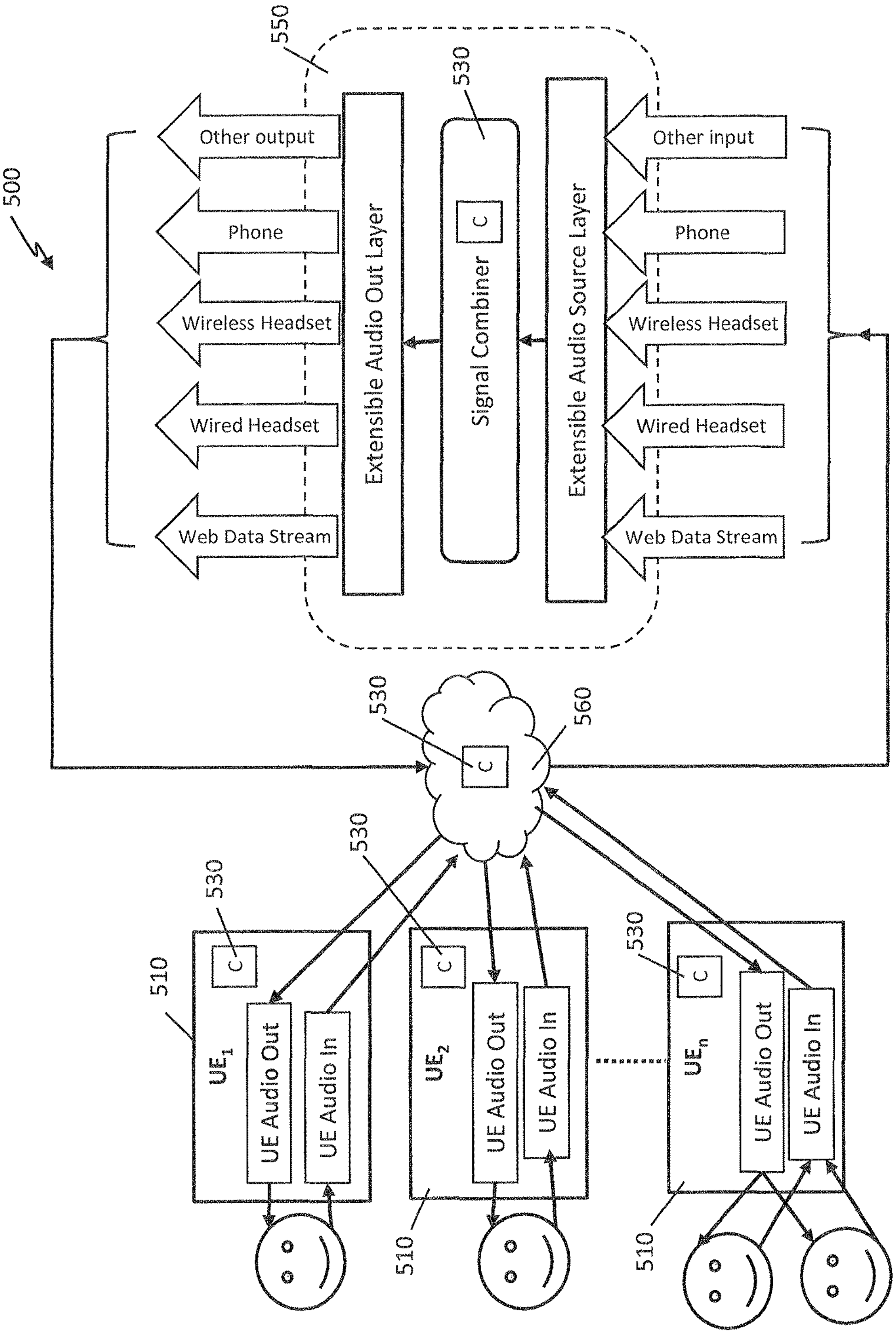
FIG. 7 is a block diagram of a closed audio system for personalized audio experience management, in accordance with the fifth exemplary embodiment of the present disclosure.

FIG. 7 is a block diagram of a closed audio system 500 for personalized audio experience management, in accordance with the fifth exemplary embodiment of the present disclosure. In particular, FIG. 7 depicts the closed audio system 500 connected to a cloud-based network 560 which is positioned interfacing both the UEs 510 and the hub 550. Additionally, FIG. 7 illustrates the ability for the processing of the audio to occur at any one position along the architecture, or at multiple positions, as indicated by combiner 530. For example, audio processing can occur within the UE 510, within a hub positioned on the cloud 560, and/or within a centralized hub 550, such as one positioned within a server or a computing device. It is also noted that the position of the cloud network 560 can change, depending on the design of the architecture. Some of the UEs 510 may be connected directly to the cloud network 560 while others may be connected to the hub 550, such that the audio input signal is transmitted to the hub 550 without needing to be transmitted to the cloud network 560. All variations and alternatives of this multi-user architecture are envisioned.

Figure 8:
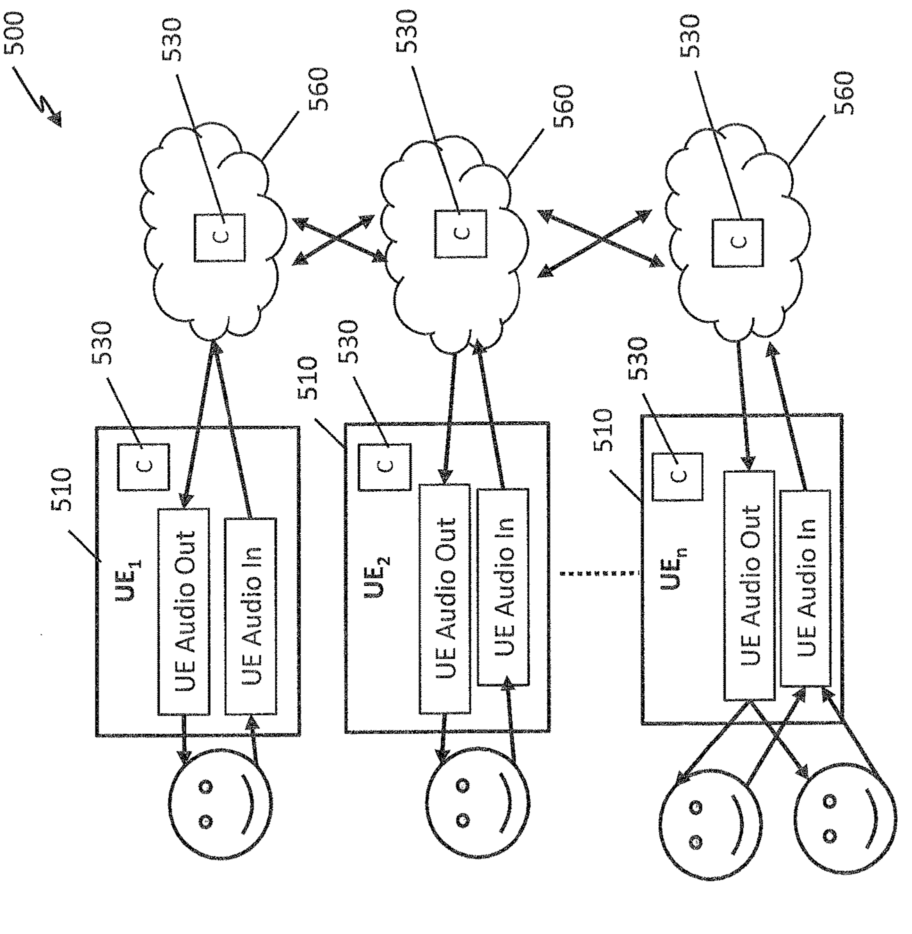
FIG. 8 is a block diagram of a closed audio system for personalized audio experience management, in accordance with the fifth exemplary embodiment of the present disclosure.

FIG. 8 is a block diagram of a closed audio system 500 for personalized audio experience management, in accordance with the fifth exemplary embodiment of the present disclosure, where each of the UEs 510 is connected to a different networking hub located on the cloud network 560. This may be a virtual hub. Each of the hubs on the cloud networks 560 are cross-linked with one another, such that all of the processing occurring at any one hub is transmittable to another hub, and all of the hubs can network together to process the audio signals in any combination desirable. As an example of the architecture of FIG. 8, it may be that the user for $UE_1$ has a UE 510 which is capable of pre-processing the audio signal on $UE_1$, with the pre-processed signal then going to the cloud network 560 it is connected to. This cloud network 560 may include a local cloud network to the $UE_1$, such as one positioned within a near geographic location to $UE_1$, $UE_2$, and $UE_n$ may be used similarly. The resulting pre-processed audio signals from each of the UEs 510 may then be transmitted between the various cloud networks 560 and the combined signal may then be transmitted back to each UE 510.

Figure 9:
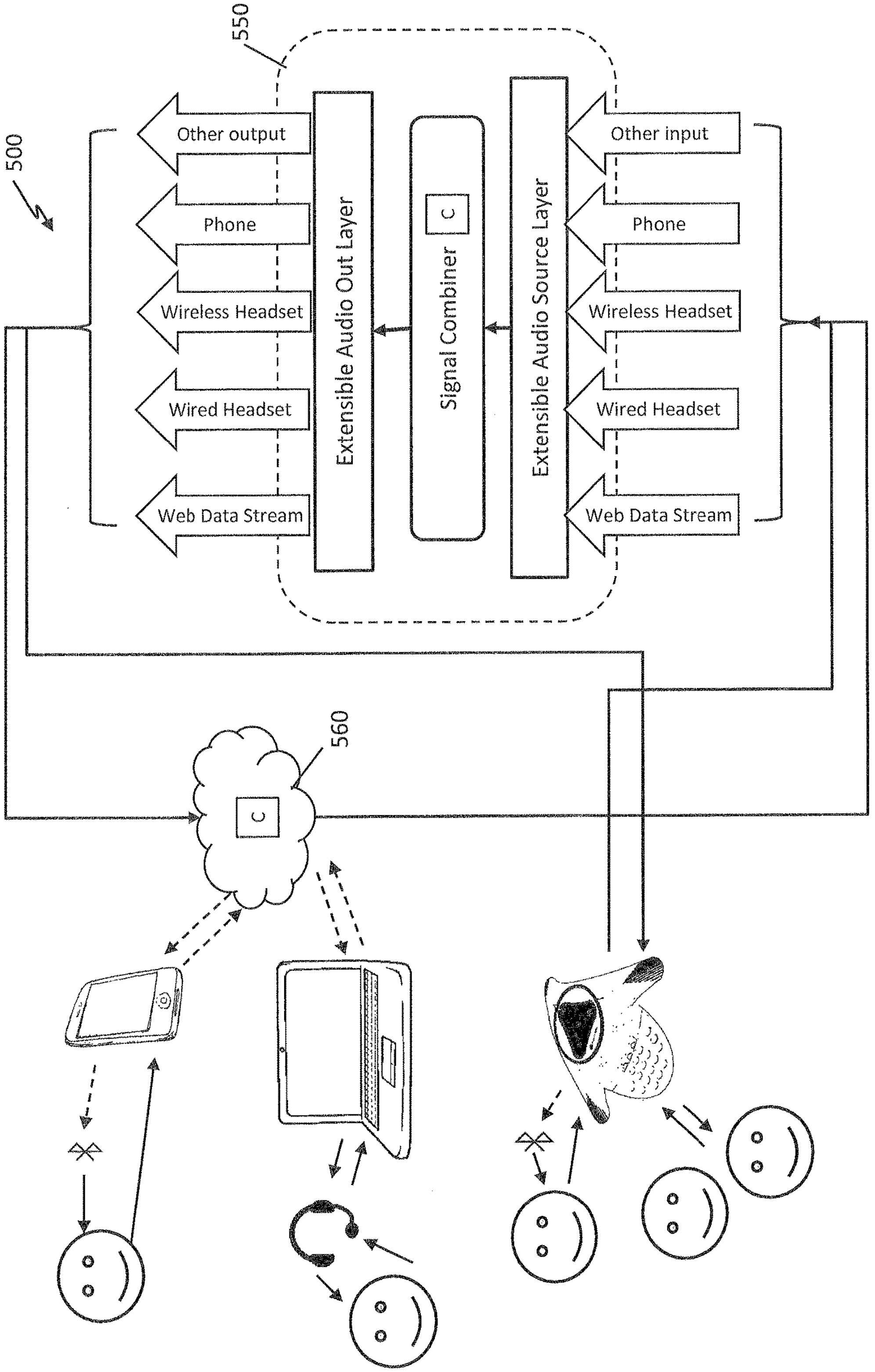
FIG. 9 is a block diagram of a closed audio system for personalized audio experience management, in accordance with the fifth exemplary embodiment of the present disclosure.

FIG. 9 is a block diagram of a closed audio system 500 for personalized audio experience management, in accordance with the fifth exemplary embodiment of the present disclosure. In particular, FIG. 9 illustrates one example of an arrangement of the network-based group audio architecture. As shown, a first user with a cell phone may be connected to the cell phone with a Bluetooth earbud which allows for wireless transmission of the audio signal from the cell phone to the user, as indicated by the broken lines, while the microphone on the cell phone receives the audio output generated by the user. A second user may utilize a laptop computer with a wired headset to communicate, where the wired headset both outputs the audio signal to the user and receives the audio input signal from the user. Both the cell phone and the laptop may be wirelessly connected to a combiner hub on a cloud network 560. A separate group of users may be positioned within the same room and utilizing a conferencing phone to output and input the audio signals, which are connected to a central hub 550. One of the members of this group may have difficulty hearing, so he or she may utilize a Bluetooth device to receive a specific audio feed. Accordingly, as shown in this arrangement of the architecture, different users can connect through the system using various devices, wired or wireless, which connect through cloud networks 560, central hubs 550, or other locations.

Figure 10:
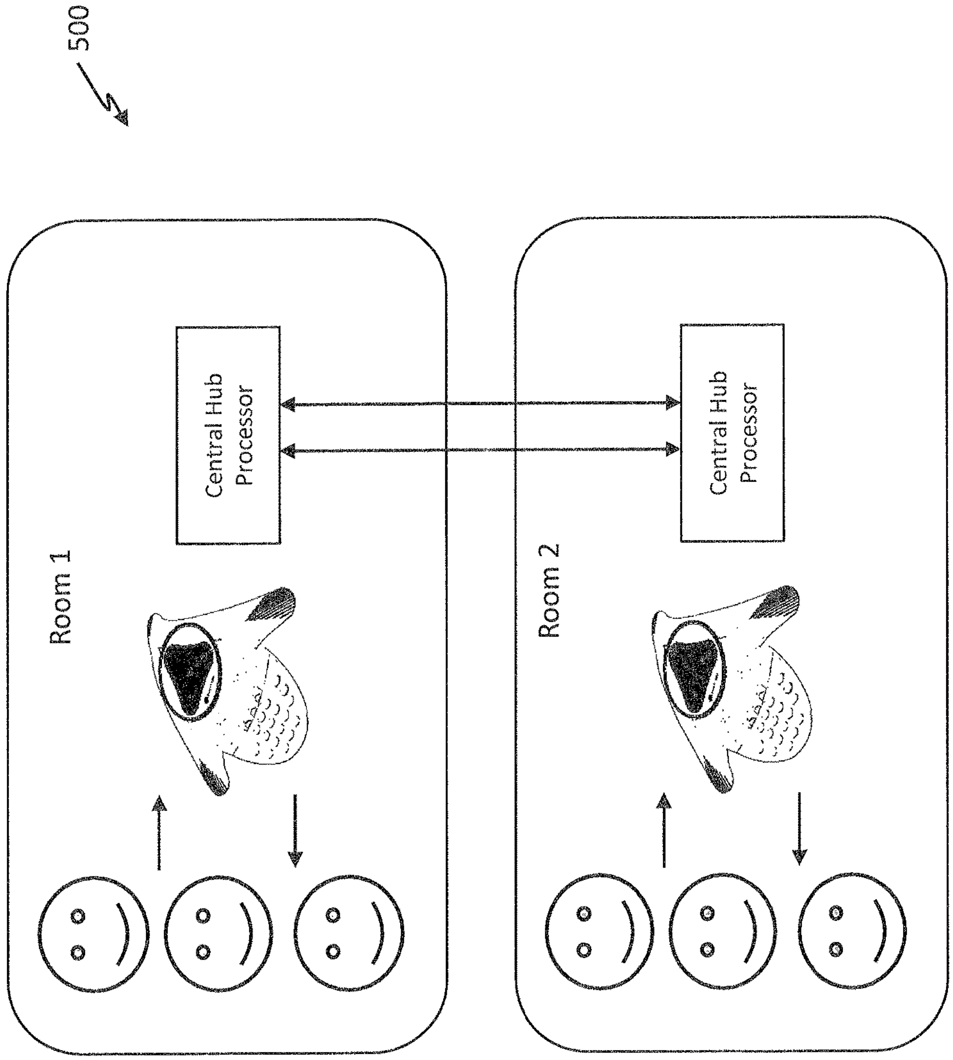
FIG. 10 is a block diagram of a closed audio system for personalized audio experience management, in accordance with the fifth exemplary embodiment of the present disclosure.

FIG. 10 is a block diagram of a closed audio system 500 for personalized audio experience management, in accordance with the fifth exemplary embodiment of the present disclosure. FIG. 10 illustrates another example where there are two different rooms: room 1 and room 2. Each room has a conference table with a conference phone system, such that the users in each of the rooms can communicate through the conference phone system. Each of the conference phone systems may include a central hub processor which processes and combines the audio signal, as previous described, such that each of the two rooms can effectively process the audio for that room, and the two central hub processors are connected together to transmit audio signals between the two rooms such that the desired communication can be achieved. A master processor may also be included between the two central hub processors to facilitate the communication.

One of the benefits of the system as described herein is the ability to compensate for and address delay issues with the audio signals. It has been found that people within the same room conducting in-person communication are sensitive to audio delays greater than 25 milliseconds, such that the time period elapsing between speaking and hearing what was spoken should be no more than 25 milliseconds. However, people who are not in-person with one another, e.g., people speaking over a phone or another remote communication medium, are accepting of delays of up to 2 seconds. And, a conversation with users in various locations will commonly include different users using different devices, all of which may create delays. Thus, depending on the architecture, the delay may vary, e.g., wired v. wireless, Bluetooth, etc., where each piece of the architecture adds delay.

Due to the timing requirements with preventing delay, there is often little time for processing of the audio signal to occur at a remote position, e.g., on the cloud, because it takes too long for the audio signal to be transmitted to the cloud, processed, and returned to the user. For this reason, processing the audio signal on the UE devices, or on another device which is as close to the user as possible, may be advantageous. When users conduct communication with remote users, there may be adequate time for the transmission of the audio signal to a processing hub on the cloud, for processing, and for the return transmission. The system allows for connecting in a low-delay fashion when users are in-person, but users can also connect at a distance to absorb more delay. Accordingly, the system gives flexibility of combining the various schemes of having some people in-person with others located remote, some on certain devices, while others are on other devices, all of which can be accounted for by the system to provide a streamlined multi-user audio experience. Additionally, the architecture of the subject system can account for delay at a cost-effective level, without the need for specific, expensive hardware for preventing delay, as the system can solve the problem using consumer-grade electronics, e.g., cell phones, with the aforementioned processing.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the appended claims.

The invention claimed is:

1. A closed audio system for personalized audio experience management and audio clarity enhancement in group audio communication, the closed audio system comprising:

a plurality of user equipment (UEs) with each UE receiving an audio input signal from each corresponding user; and an audio signal combiner receiving the audio input signals from the plurality of UEs and generating a desired mixed audio output signal for each UE of the plurality of UEs;

wherein the mixed audio output signal for each UE is generated based at least on a selection input from each corresponding user;

wherein after receiving the audio input signals from the plurality of UEs, the audio signal combiner performs an audio clarity check to verify whether the audio input signal from each UE meets a clarity threshold; and wherein the group audio communication further comprises at least one of: a group hearing aid system; a localized virtual conference room; a geographically dynamic virtual conference room; and a party line communication.

2. The closed audio system of claim 1, wherein the audio signal combiner includes a communication interface, a processor and a memory; wherein the communication interface couples to each UE of the plurality of UEs.

3. The closed audio system of claim 1, wherein the UEs are smartphones, tablets, walkie-talkies, headphone sets or a combination thereof.

4. The closed audio system of claim 1, wherein at least one UE of the plurality of UEs apply a preliminary audio clarity enhancement for the audio input signal.

5. The closed audio system of claim 4, wherein the preliminary audio clarity enhancement includes at least one of passive noise cancellation, active noise cancellation, amplitude suppression for selected frequency band and voice amplification.

6. The closed audio system of claim 1, wherein if a particular audio input signal from a particular UE of the plurality of UEs does not meet the clarity threshold, the audio signal combiner isolates the particular audio input signal in real time and performs clarity enhancement for the particular audio input signal.

7. The closed audio system of claim 1, wherein the selection input from each corresponding user include whether the corresponding user wants to include the corresponding user's own audio input to be included in the mixed audio output signal.

8. The closed audio system of claim 1, wherein the selection input from each corresponding user includes a list of desired UEs among the plurality of UEs, wherein only the audio input signals from the desired UEs are included for the mixed audio output signal for the corresponding user.

9. A method of group audio communication for personalized audio experience management and audio clarity enhancement, the method comprising:

receiving a plurality of audio input signals from a plurality of users via a plurality of user equipment (UEs) with each user corresponding to a UE;

sending the plurality of audio input signals to an audio signal combiner; and generating by the audio signal combiner a desired mixed audio output signal for each UE of the plurality of UEs;

wherein the mixed audio output signal for each UE is generated based at least on a selection input from each corresponding user;

performing, at the audio signal combiner, an audio clarity check to verify whether the audio input signal from each UE meets a clarity threshold after the audio signal combiner receives the audio input signals from the plurality of UEs; and wherein the group audio communication further comprises at least one of: a group hearing aid system; a localized virtual conference room; a geographically dynamic virtual conference room; and a party line communication.

10. The method of claim 9, wherein the UEs are smartphones, tablets, walkie-talkies, headphone sets or a combination thereof.

11. The method of claim 9, wherein the method further comprises applying a preliminary audio clarity enhancement for at least one audio input signal using a corresponding UE.

12. The method of claim, 11, wherein the preliminary audio clarity enhancement includes at least one of passive noise cancellation, active noise cancellation, amplitude suppression for a selected frequency band and voice amplification.

13. The method of claim 9, wherein the method further comprises if a particular audio input signal from a particular UE does not meet the clarity threshold, the audio signal combiner isolates the particular audio input signal in real time and performs clarity enhancement for the particular audio input signal.

14. The method of claim 9, wherein the method further comprises starting a private conversation among a list of selected users from the plurality of users wherein the audio input signals from those selected users related to the private conversation are not sent to unselected users who are not in the private conversation.

15. The method of claim 14, wherein the list of selected users within the private conversation is not known to the unselected users who are not in the private conversation.

16. A non-transitory computer-readable medium for storing computer-executable instructions that are executed by a processor to perform operations for closed audio system for personalized audio experience management and audio clarity enhancement in group audio communication, the operations comprising:

receiving a plurality of audio input signals from a plurality of user equipment (UEs) in a group audio communication;

receiving a plurality of selection inputs from each UE of the plurality of UEs;

generating a plurality of mixed audio output signals; and sending the plurality mixed audio output signals to the plurality of UEs;

wherein each mixed audio output signal related to a corresponding UE of the plurality of UEs is generated based at least on a selection input from the corresponding UE;

performing an audio clarity check to verify whether the plurality of audio input signals from the plurality of UEs meets a clarity threshold; and wherein the group audio communication further comprises at least one of: a group hearing aid system; a localized virtual conference room; a geographically dynamic virtual conference room; and a party line communication.

17. The computer-readable medium of claim 16, wherein the operations further comprise if a particular audio input signal from a particular UE does not meet the clarity threshold, isolating the particular audio input signal in real time and performing clarity enhancement for the particular audio input signal.

* * * * *